United States Patent
Jamieson et al.

(10) Patent No.: US 6,721,552 B1
(45) Date of Patent: Apr. 13, 2004

(54) LOW POWER RADIO NETWORK

(75) Inventors: Philip A. Jamieson, Dorking (GB); Ian A. Marsden, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 434 days.

(21) Appl. No.: 09/663,596

(22) Filed: Sep. 18, 2000

(30) Foreign Application Priority Data

Oct. 9, 1999 (GB) ............................................. 9923863

(51) Int. Cl.⁷ ............................ H04B 7/00; H04Q 7/00; H04L 12/28
(52) U.S. Cl. ....................... 455/403; 455/41.2; 455/500; 455/507; 370/351; 370/360; 370/398
(58) Field of Search ................................ 455/403, 420, 455/41.1, 500, 507, 508, 442.1; 370/351, 360, 398, 399, 338; 700/3, 11, 89; 340/3.1, 332, 407.1, 407.2

(56) References Cited

U.S. PATENT DOCUMENTS

| | | | |
|---|---|---|---|
| 4,887,266 A | * 12/1989 | Neve et al. | 370/349 |
| 5,384,697 A | * 1/1995 | Pascucci | 700/10 |
| 6,160,795 A | * 12/2000 | Hosemann | 370/256 |
| 6,331,813 B1 | * 12/2001 | Belliveau | 340/310.01 |
| 6,535,498 B1 | * 3/2003 | Larsson | 370/338 |

FOREIGN PATENT DOCUMENTS

WO    WO9914897    3/1999    ............ H04L/12/28

OTHER PUBLICATIONS

P. Dhebri & S. Desai, "Secure Access using Bluetooth Technology", Date N/A, WAP over Bluetooth Master Thesis, Carnegie Mellon.*

* cited by examiner

Primary Examiner—Duc M. Nguyen
(74) Attorney, Agent, or Firm—Jack D. Slobod

(57) ABSTRACT

A low power radio network comprises a master radio device (10) having a routing table (20), and a plurality of slave devices (SL1 to SL6), at least one of the slave devices has an inputting device (38, 40) and other of the slave devices (SL1 to SL4) being associated with end user devices (LUM1 to LUM4) compatible with the inputting device. In order to create a functional link between at least a predetermined end user device and the inputting device, the radio network is placed in a pairing mode in which the master device (10) activates the end user devices sequentially and at the activation of the predetermined end user device, the inputting device is activated which causes the routing table to create a pairing link.

6 Claims, 1 Drawing Sheet

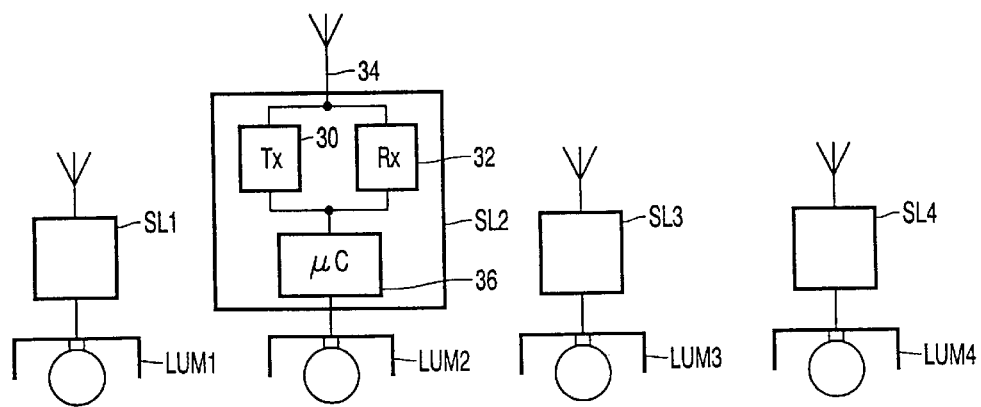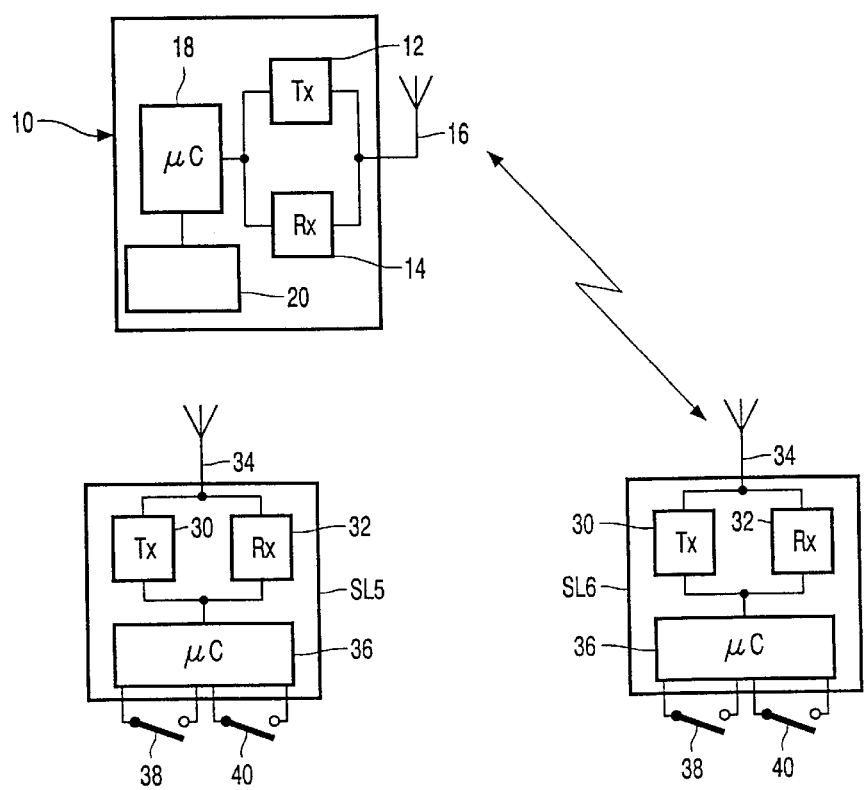

LOW POWER RADIO NETWORK

The present invention relates to a low power radio network and particularly to creating logical pairing links between master and slave devices.

In known radio networks the creation of logical pairing links is typically done in one of two ways.

In the first way all the slave devices can only communicate with the master device, which constitutes a "hub" and messages are not routed. Thus the "hub" must be the focus for all of the slave devices and any message from a slave device can only have one possible target the "hub". (An example of this would be a radio security system where the control box is the "hub" and all devices communicate only with the control box). The disadvantages of this type of system are that the "hub" of the network has to be a dedicated unit that has knowledge of each device and how the system should interact and without the "hub" the network cannot exist.

In the second way a user has to create all the logical links usually through the actuation of dip-switches. In this system the concept of a master-slave network is removed and every message is broadcast as a network broadcast for anyone to receive and interpret if they want to. The user chooses what group a slave device should be part of and in turn the user decides what group they want the switch to control. The disadvantages of this system are as follows:

- The device needs to have a set of user accessible dip-switches, the effect of this is to increase the component count, hardware cost and limit the design packaging.
- The user needs to have knowledge of all the current devices on the network and their addresses so that he can assign a new device a new unused address.
- If the user makes a mistake with the dip—switches then the only feedback that the user will get is the device not working.
- The lack of a network manager device means there is no security. Anyone can set up any device to work on your network.
- The network has no "manager device" that can control the use of the radio waves thus there is no guarantee in channel availability.

An object of the present invention is to facilitate the creation of logical pairing links between devices on a low power radio network.

According to one aspect of the present invention there is provided a method of creating logical functional links in a master-slave radio network comprising a master radio device having a routing table and a plurality of enumerated slave devices, at least one of said slave devices having an inputting device and others of said slave devices being associated with end user devices compatible with the inputting device, the method comprising placing the radio network into a pairing mode in which the master device successively activates the compatible end user devices in accordance with a predetermined sequence, actuating the inputting device in response to activating at least a predetermined one of the compatible end user devices, and creating a functional link between the inputting device and the predetermined end user device in the routing table.

According to a second aspect of the present invention there is provided a low power radio network comprising a master radio device having a routing table and a plurality of enumerated slave devices, at least one of said slave devices having an inputting device and others of said slave devices being associated with end user devices compatible with the inputting device, wherein the routing table comprises at least one functional link between the inputting device and a predetermined one of the end user devices.

The method in accordance with the present invention enables communication to be possible between any device and any other device on a network although the topology is a master-slave network. The master-slave network allows one master device to be responsible for the network and also means that the slave devices do not need to have any information about the other slave devices on the network. Further, a slave device is able to communicate with another slave device on the network without the master device having any knowledge of the message content.

The present invention will now be described, by way of example, with reference to the accompanying drawing, wherein FIG. 1 is a block schematic diagram of a low power radio network.

The low power radio network shown in FIG. 1 will for the sake of convenience be described with reference to a lighting system. However it is to be understood that the principles of the present invention can be applied to any other suitable application requiring low cost, low power consuming devices operating over ranges of up to 50 meters, for example home automation, personal area networks.

Essentially the radio network comprises a star arrangement comprising a master radio device 10 functioning as a hub and low power radio slave devices SL1 to SL6 which are able to communicate with the master device 10 on a single channel in accordance with a carrier sense multiple access protocol. Such protocols are known and accordingly will not be described.

The master device 10, which may be powered from the mains supply, comprises a transmitter 12 and a receiver 14 coupled on the one hand to an antenna 16 and on the other hand to a microcontroller 18. A routing table 20 is coupled to the microcontroller 18 and in operation stores information about the radio network.

Each of the slave devices SL1 to SL6 is a low cost, battery powered device which comprises a transmitter 30 and a receiver 32 coupled on the one hand to an antenna 34 and on the other hand to a microcontroller 36. Those of the slave devices which function as remote controllers, say SL5 and SL6, have a simple, man/machine interface comprising say two switches 38, 40, voice activated inputting devices or other suitable inputting devices. The other of the slave devices, say SL1 to SL4, are coupled to apparatus to be controlled. In this example, the apparatus comprises luminaires LUM1 to LUM4.

The slave devices SL1 to SL6 have very small memories and have no knowledge about the radio network they become part of. Thus for example when a new slave device is to enter the radio network it has no prior knowledge of the network nor will it gain any knowledge about the network. Consequently it comprises a universal, off the shelf device which can join or leave any compatible radio network.

In order for a slave device to join a network it has to be enumerated by the master device. Enumeration is a process by which a slave device is given an identity by the master device 10. An example of an enumeration process is disclosed in the Applicant's copending patent application identified by the Applicant's reference PHB 34405 and originally filed as British Patent Application 9923864.4 dated Oct. 9, 1999. Additionally this process may be used to provide information, derived from say received signal strength at the master device 10, about the range of the slave device.

In order to describe the process of creating logical pairing links it will be assumed that the slave devices SL1 to SL6 are already enumerated on the network. This means that they already have been allocated an address and thus have a means of communicating with the master device 10. However at this stage the slave device has no idea of what else is on the network and indeed what it is controlling and/or being controlled by. This is where pairing comes in, pairing is the process of creating the logical control links between an "input" slave device such as a remote control device SL5 or SL6 and a corresponding "output" slave device SL1 to SL4. Pairing by definition has to be overseen by the user to ensure the desired links are made, but the aim is to minimise the amount of user interaction required and also allow the process to be carried out on devices with relatively little in the way of user interface. Because the network is master-slave in structure any device only knows about the "master" of the network. So any pairing procedure has to be via the master device 10. The pairing thus takes the form of the routing table 20 in the master device 10. The routing table is constructed in the master device 10 on the assumption that no device on the network has any more than some very basic user interfaces.

To create a logical link, the master device 10 is put into a pairing mode, for example by pressing an enumerate/pair button 38 on the slave device SL5 twice. Once in pairing mode the user identifies to the master device what type of slave device it is trying to link. For example the user identifies a light switch, say the remote control device SL6, the master knows that it is a light switch from device information structure that was downloaded during the enumeration process. From this the master will identify in turn any compatible devices on the network i.e. luminaires LUM1 to LUM 4. If the user decides that he wants to make the link between the slave device SL6 and one or more of the currently identified luminaires he confirms this by pressing the switch 40. The master received this message and constructs the routing table accordingly.

Assuming that the slave device SL6 is to control the luminaire LUM2, the master device 10 sequentially energises the luminaires LUM1 to LUM4 for a short period. When LUM1 is energised, the user takes no action. When LUM2 is energised the user actuates the switch 40 on the slave device SL6 which enables a pairing link to be created in the routing table 20. No action is taken by the user when LUM3 and LUM4 are energised.

If it is desired that the slave device SL6 should be paired with LUM2 and say LUM4, then the master device 10 sequentially energises the luminaires LUM1 to LUM4 and when LUM2 is energised, the user actuates the switch 40 which enables a pairing link to be created in the routing table 20. When LUM4 is energised in the same sequence and the switch 40 is actuated, another pairing link is created in the routing table but these links are ganged in the sense that the slave device SL6 controls both LUM2 and LUM4 simultaneously.

In a variant of the described pairing process, the remote control slave device SL5 or SL6 may send an actual "I want to pair" message to the master device 10 rather than merely sending an unmodulated signal for say 2 seconds.

In a further variant of the described pairing process which makes use of the master device 10 storing range information, the sequence of momentarily energising the luminaires LUM1 to LUM4 is modified so that the luminaires closer to the master device 10 are energised first with the more distant ones later. Thus a group of luminaires closest to the master device 10 can be paired.

In other applications the inputting device may be a voice activated microphone and the slave devices may be associated with sound, video or tactile transducers.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of low power radio networks and component parts therefor and which may be used instead of or in addition to features already described herein.

What is claimed is:

1. A method of creating logical functional links in a master-slave radio network comprising a master radio device having a routing table and a plurality of enumerated slave devices, at least one of said slave devices having an inputting device and others of said slave devices being associated with end user devices compatible with the inputting device, the method comprising placing the radio network into a pairing mode in which the master device successively activates the compatible end user devices in accordance with a predetermined sequence, actuating the inputting device in response to activating at least a predetermined one of the compatible end user devices, and creating a functional link between the inputting device and the predetermined end user device in the routing table.

2. A method as claimed in claim 1, characterized in that a functional link is created between at least two end user devices and the inputting device by actuating the switch interface in response to the activation of the predetermined end user devices in the same activation sequence.

3. A method as claimed in claim 1, characterized in that said predetermined sequence takes into account the range of the compatible end user devices from the master radio device.

4. A method as claimed in claim 1, characterized in that the radio network is placed into a pairing mode by actuating an inputting device.

5. A low power radio network comprising:
a master radio device having a routing table and
a plurality of enumerated slave devices, at least one of said slave devices having an inputting device and others of said slave devices being associated with end user devices compatible with the inputting device,
wherein the network is in a pairing mode in which the master radio device successively activates the compatible end user devices in accordance with a predetermined sequence, wherein the inputting device is activated in response to activating at least one predetermined compatible end user device, and wherein the routing table comprises at least one functional link between the inputting device and the predetermined compatible end user device.

6. The network of claim 5, wherein the routing table comprises at least one functional link between at least two compatible end user devices and the inputting device.

* * * * *